A. A. HOY.
MEAT PRODUCT AND PROCESS FOR PRODUCING THE SAME.
APPLICATION FILED FEB. 26, 1912.
1,129,868.
Patented Mar. 2, 1915.
2 SHEETS—SHEET 2.
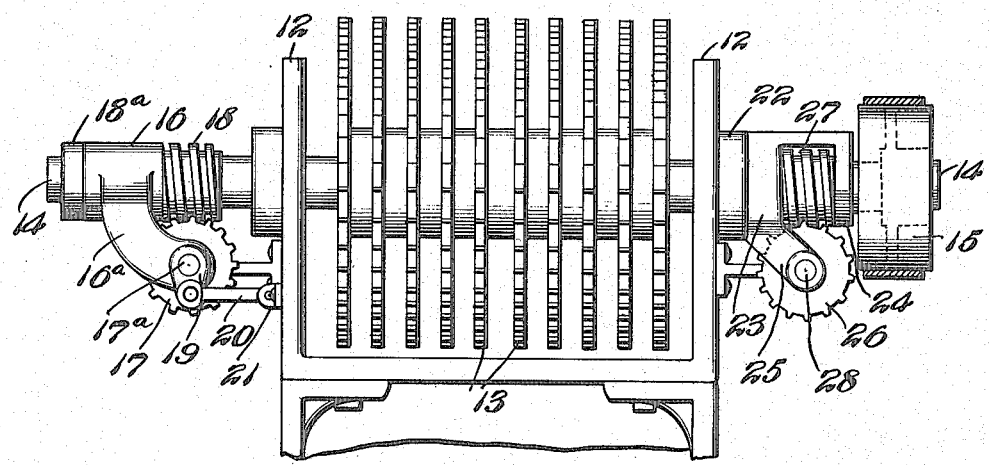
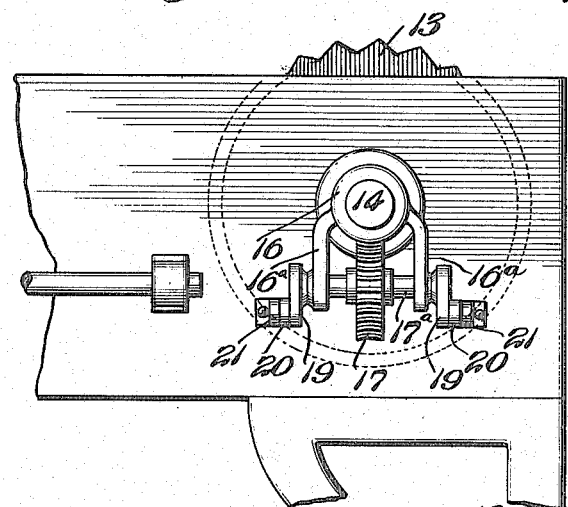
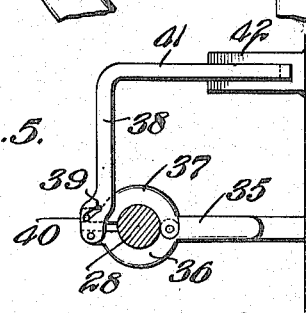
Witnesses:
J. Adolph Bishop
Henry M. Hertel
Inventor,
Adea A. Hoy,
By John H. Bruning
Atty.

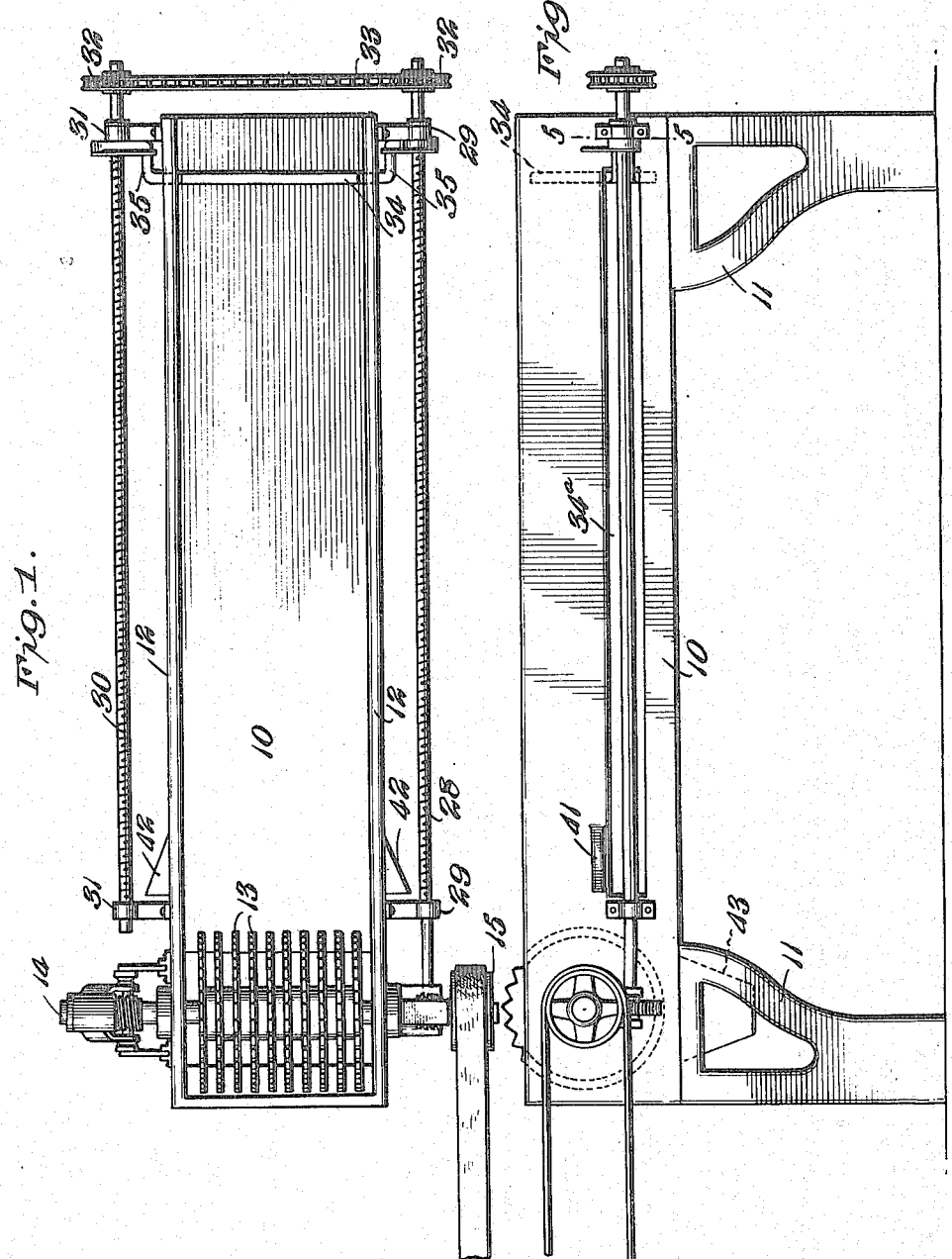

UNITED STATES PATENT OFFICE.

ADEA A. HOY, OF ST. LOUIS, MISSOURI.

MEAT PRODUCT AND PROCESS FOR PRODUCING THE SAME.

1,129,868.

Specification of Letters Patent.

Patented Mar. 2, 1915.

Application filed February 26, 1912. Serial No. 680,053.

*To all whom it may concern:*

Be it known that I, ADEA A. HOY, a citizen of the United States, and residing at St. Louis, in the State of Missouri, have invented certain new and useful Improvements in Meat Products and Processes for Producing the Same, of which the following is a specification.

This invention relates to food products, and more particularly to meat products and a process for producing the same.

One method of reducing meat to a form in which it will be more tender than in its original state, consists in grinding or cutting the same in a suitable machine. Since however meat has a grain or fiber and is comparatively soft and pliable, it is not possible to reduce it to a finely divided state without compacting the same, and even then the knives must be exceedingly sharp to cut the meat. The ground product will have a more or less stringy form, due to the fact that the coöperating knives will be wedged apart more or less by the meat creeping and wedging between them. Another method of reducing meat to a divided state consists in drying the same and then pounding the dried product with a hammer or mallet. This will reduce the meat to a more or less finely divided state, but will not reduce it to a comminuted condition, since a considerable part will be stringy, due to the fibrous nature of meat. This process will also compact the meat and thereby destroy its palatable qualities to a great extent. The product so produced is known as pemmican and is used to a considerable extent in the arctic regions. In order to preserve the same it is mixed with boiling fat. This product is not very palatable, since the drying and pounding processes destroy that quality to a great extent.

One of the objects of this invention is to produce a meat product, which while it is reduced to a finely divided or comminuted state, will not have its palatable qualities destroyed. The product is in such a state, and the process for producing the same is so carried out, that it is not compacted, since it is not subjected to a pounding action which will compress the meat cells, but the meat cells are practically in their original state, although they are more or less open. The process is carried out in such a manner that the meat fibers will be cut up endwise so that the product has an absence of the stringy fiber which is present in the products as produced heretofore. In doing this however the meat cells are not compacted and broken up.

Another object is to produce a meat product which can be preserved for a considerable length of time and which will require very little heat to cook it.

Another object is to provide a process for producing this product.

Generally stated in accordance with this invention the meat is reduced to a rigid state and is then pulverized in a suitable manner. More specifically stated the meat is frozen until it is in a rigid and hard state and is then subjected to an action which will reduce the frozen rigid meat to a powder. This last step is preferably accomplished by subjecting the frozen meat to the action of gang saws.

The machine for performing the process is illustrated in the accompanying drawings in which:

Figure 1 is a plan view of the machine, Fig. 2 is a side elevation, Fig. 3 is an end elevation with the end of the bed removed, Fig. 4 is a detail side elevation from the opposite side of the machine of that shown in Fig. 2, and Fig. 5 is a detail section taken on the line 5—5 Fig. 2.

Referring to the accompanying drawings, 10 designates a bed or support mounted on legs or end frames 11. The bed is provided with side members or frames 12 so as to give it a trough-like construction. A series of saws 13 are mounted upon and secured in spaced relation to the shaft 14 which is mounted in bearings in the side frames 12 and is driven by means of a pulley 15. The shaft 14 and the saws mounted thereon are arranged to be vibrated laterally by the following mechanism: A bracket 16 is loosely mounted upon one end of the shaft and is provided with downwardly extending arms 16$^a$ providing bearings for a wormwheel 17 meshing with a worm 18 rigidly secured to the shaft. The bracket 16 is supported on the shaft between the worm 18 and a collar 18$^a$ also secured to the shaft. The wormwheel shaft 17$^a$ has mounted thereon a pair of cranks 19 which connect with pitmen or links 20 pivoted to brackets 21 secured to one of the side frames 12. By means of the above mechanism the shaft 14 and the gang saws mounted thereon will be vibrated laterally in the side frames 12 as the shaft is rotated, but at a lower speed than the speed of rotation of the shaft.

A bracket 22 mounted on the other side frame 12 is provided with bearing lugs 23 and 24 embracing the shaft 14, and with downwardly extending arms 25 forming bearings for a wormwheel 26 meshing with a worm 27. This worm is splined to the shaft 14 and is mounted between the bearing lugs 23 and 24 which support the worm against endwise movement as the shaft moves endwise. The pulley 15 is preferably rigidly secured to the shaft 14, but may be splined thereto. The wormwheel shaft 28 is supported in bearings 29 on one of the side frames 12, and a second shaft 30 is supported in bearings 31 on the other side frame 12 and is driven from the shaft 28 by means of sprockets 32 and a chain 33. A slide 34 is mounted on the bed and between the side frames 12 and is guided thereon and in slots 34ª in the side frames. The shafts 28 and 30 are threaded as shown. The slide 34 has mounted thereon a pair of laterally extending lugs 35 extending through the slots 34ª. Each of these lugs has mounted thereon an expansible and contractible nut composed of members 36, 37 arranged to be contracted and expanded to grip and release the shafts 28 and 30. Means are provided for contracting and expanding this nut, and this means is preferably so constructed as to be automatically thrown out of operation at the end of the feeding movement of the slide 34. This means comprises a lever 38 pivoted upon the member 36 and having a cam slot 39 engaging a pin 40 upon the member 37. The lever 38 is provided with a laterally extending lug 41 arranged to engage a wedge 42 on the side frame 12. It will be understood of course this last described mechanism is duplicated on opposite sides of the machine. A chute 43 is located below the gang saws.

The operation is as follows: The meat is frozen until it is rigid and stiff. To do this it is necessary to freeze it to 0° F. or below. The meat in this rigid and hard form is placed on the bed or support 10 in front of the slide 34. The levers 38 are then moved inwardly to cause the nuts to grip the threads on the shaft 28 and 30. The machine is then started. The rigid meat will be fed against the gang saws and subjected to the action of these saws. These saws are run at a high rate of speed (2000 revolutions, more or less), and are simultaneously vibrated laterally but at a considerably reduced speed with respect to the rotative movement of the same. The feed is also made sufficiently fine so that the cut taken by the saws will be fine. When the frozen rigid meat is subjected to the action of the saws in the manner described, the meat will be reduced to a finely divided powdered state and discharged through the chute 43 into a suitable receptacle or conveyer. Since the saws are given a lateral movement as they rotate, they will not become clogged up and will act uniformly upon the frozen meat. The machine is entirely automatic in its operation and will need practically no attention, since the feed is automatically thrown out when the slide 34 comes to the end of its feeding movement.

The peculiar action of the saws upon the frozen meat causes this meat to be reduced to a fine powder. Since the action on the meat is a cutting or scraping action rather than a pounding action, and since the meat is in a frozen and rigid condition, the fibers will be thoroughly divided endwise, but the meat cells themselves will not be condensed as is the case where the meat is subjected to a pounding action or to a cutting action in an unfrozen soft state. The resultant product will therefore be a powder having no stringy fibers. The product has many desirable and new properties and characteristics. It is in the form of a fine powder and therefore much more tender than the meat of which it was formed. It is not necessary to masticate it to the extent that is necessary with ordinary meat in order to render it digestible, in view of the fact that the fibers are thoroughly cut up endwise. In view of the fact however that the cells are not condensed by pounding, the flavor is not destroyed, but rather brought out, and its nutritious value is not reduced but rather enhanced. It requires much less heat and time to cook it in view of the fact that it is in such a finely divided state with the meat cells in the form where they can be readily cooked. The flavor and strength will not be lost by cooking as it is not necessary to prolong the cooking as with ordinary meat with its resultant loss by evaporation. The toughest meats including the sinew and cartilage are reduced to a palatable and nutritious form. As a matter of fact even the bones are reduced to a powder along with the meat in this process, since the bone will readily reduce when frozen to a low temperature.

The product can be utilized in various manners. It can be cooked with or without greases and can be seasoned in the usual manner. The seasoning material can be uniformly distributed throughout the mass much more readily than is the case with ordinary solid or ground meats. The product can be retained in its frozen state and will then keep for a long time. It can be dried in any suitable manner, and in view of its fineness can be dried uniformly throughout and in a very short time. In this condition it will keep for a long time. It can be preserved in its original condition in airtight cans or can be mixed with greases either in its original or dried condition and preserved in this manner.

It is possible to produce a meat product by rendering the meat rigid by other methods than by freezing. Thus the meat can be dried to a hard rigid state and then subjected to the action of the saw machine as described above. This product will possess many desirable properties and characteristics not possessed by pemmican. The cells will not be destroyed, while the fibers will be cut up so that the product will not be stringy, but will be in powdered form. It will therefore be more nutritious. The method described heretofore of rendering the meat rigid by freezing is however the preferable method and will produce a far superior product, since the freshness and flavor of the original meat is retained and there will be no loss by evaporation.

It is further obvious that various changes may be made in the details of the process and the product without departing from the spirit of this invention, and it is therefore to be understood that this invention is not to be limited to the specific steps or details shown and described.

Having thus described the invention what is claimed is:

1. A food product comprising undried comminuted meat powder.

2. A food product comprising fresh uncooked comminuted meat powder.

3. A food product comprising uncompacted comminuted meat powder.

4. A food product consisting of meat comminuted in a frozen state.

5. A food product consisting of meat sawdust.

6. The process of making food products consisting in rendering meat sufficiently rigid so that it can be comminuted without compacting the same and then comminuting the meat.

7. The process of making food products consisting in freezing meat and comminuting the same in the frozen state.

8. The process of making food products consisting in sawing meat in a rigid state to reduce it to a finely divided state.

9. The process of making food products consisting in freezing meat and sawing the same to reduce it to a finely divided state.

10. The process of making food products consisting in rendering fresh meat rigid and comminuting the same in the rigid state.

11. The process of making food products consisting in freezing fresh meat until rigid and then comminuting the same.

In testimony whereof I affix my signature in presence of two witnesses.

ADEA A. HOY.

Witnesses:
J. H. BRUNINGA,
MARIE E. PAUCK.